United States Patent
Hermann

[11] 3,779,406
[45] Dec. 18, 1973

[54] VEHICLE CARGO BED LOADER FOR ELONGATED ARTICLES

[75] Inventor: Christof Hermann, St. Clair Shores, Mich.

[73] Assignee: General Motors Corporation, Detroit, Mich.

[22] Filed: Sept. 28, 1972

[21] Appl. No.: 292,967

[52] U.S. Cl.................................. 214/77 P, 214/85
[51] Int. Cl............................................... B60p 1/44
[58] Field of Search........................... 296/61, 57 R; 214/77 R, 77 P, 75 T, 75 R, 85

[56] References Cited
UNITED STATES PATENTS

| | | | |
|---|---|---|---|
| 2,683,540 | 7/1954 | Wood | 214/77 P |
| 2,727,781 | 12/1955 | D'Eath | 296/61 |
| 3,510,015 | 5/1970 | Roshaven | 214/85 |

*Primary Examiner*—Robert J. Spar
*Attorney*—W. E. Finken et al.

[57] ABSTRACT

A vehicle includes an elevated cargo bed accessible through a generally rectangular gate opening selectively closed by a generally rectangular gate which supports a loader for elongated articles. The gate is pivotally mounted by support members for movement about a transverse vehicle axis between a vertical position closing the gate opening and an elevated horizontal position generally aligned with the plane of the cargo bed. Four-bar linkages mount the support members so as to move the horizontal gate between the elevated position and a lower position adjacent ground level. The loader includes a first channel-shaped article receiving member with one end pivoted to the upper side of the horizontal gate at a central portion thereof adjacent the pivotal axis of gate movement. A second channel-shaped article receiving member of the loader has a flanged bifurcated end pivoted to the free end of the first article receiving member about an axis normal to the side walls of these members. The loader is movable to an unfolded loading position where the flanges of the second member locate the members in an alinged relationship on the horizontal gate so as to extend outwardly from the gate opening. The four-bar linkages translate the horizontal gate between its elevated and lower positions and thus move the unfolded loader between the ground and the cargo bed so as to facilitate loading and unloading of elongated articles on the cargo bed. The loader is also movable to a folded storage position where the members extend transversely of the gate opening and are stored adjacent the plane of the cargo bed with the gate in its vertical position closing the gate opening. A vehicle mounted flange engages the free end of the second article receiving member to automatically maintain the loader in the storage position during operation of the vehicle.

10 Claims, 4 Drawing Figures

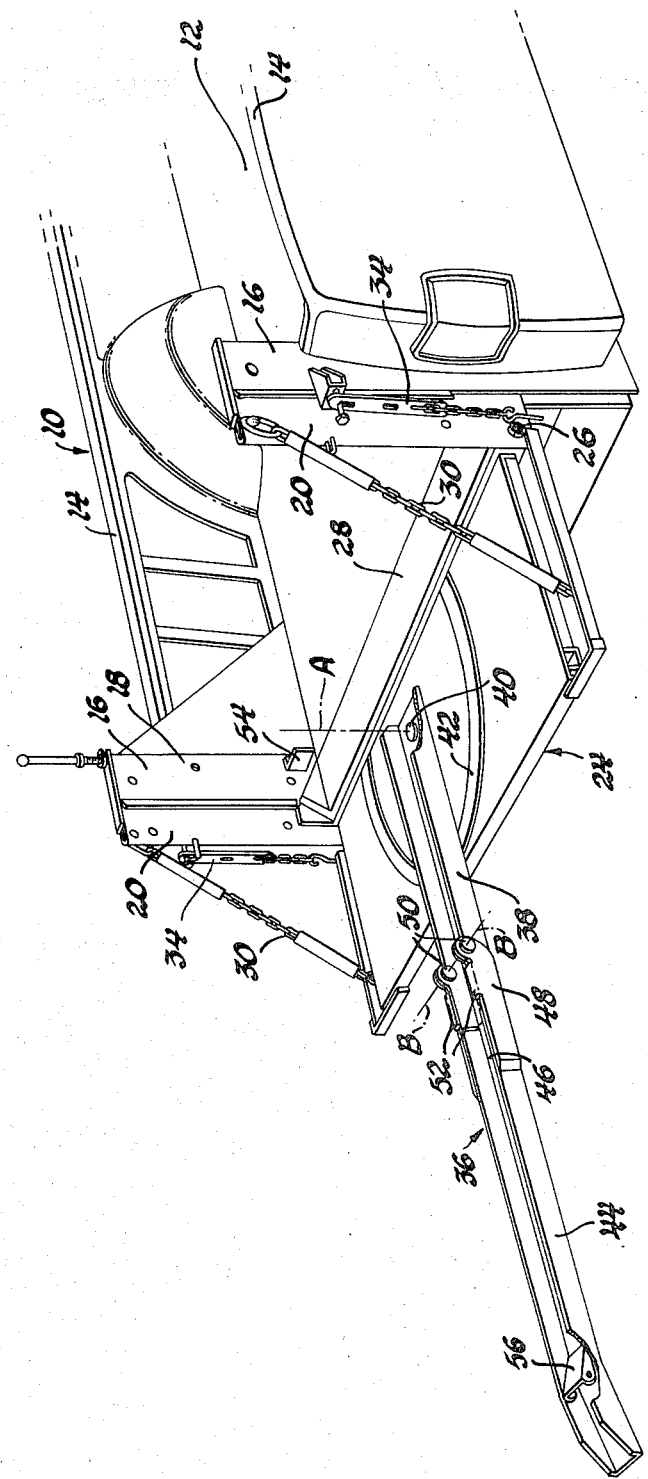

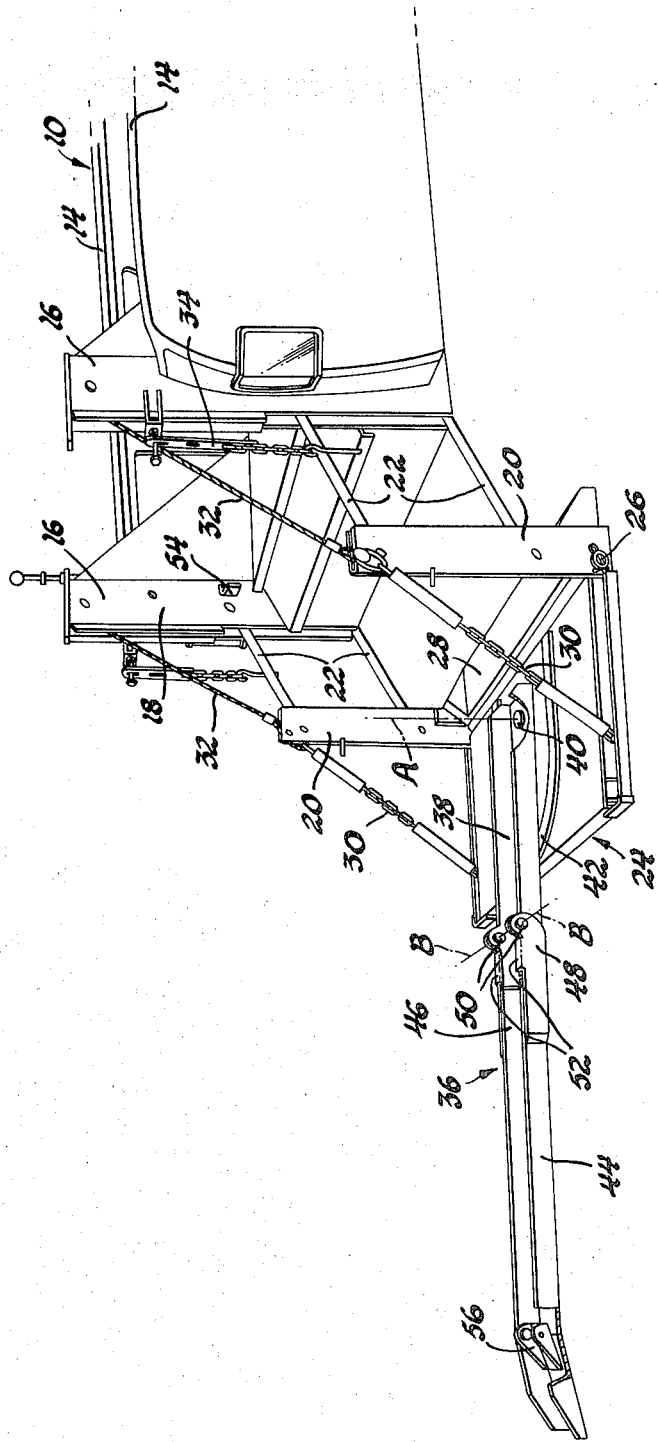

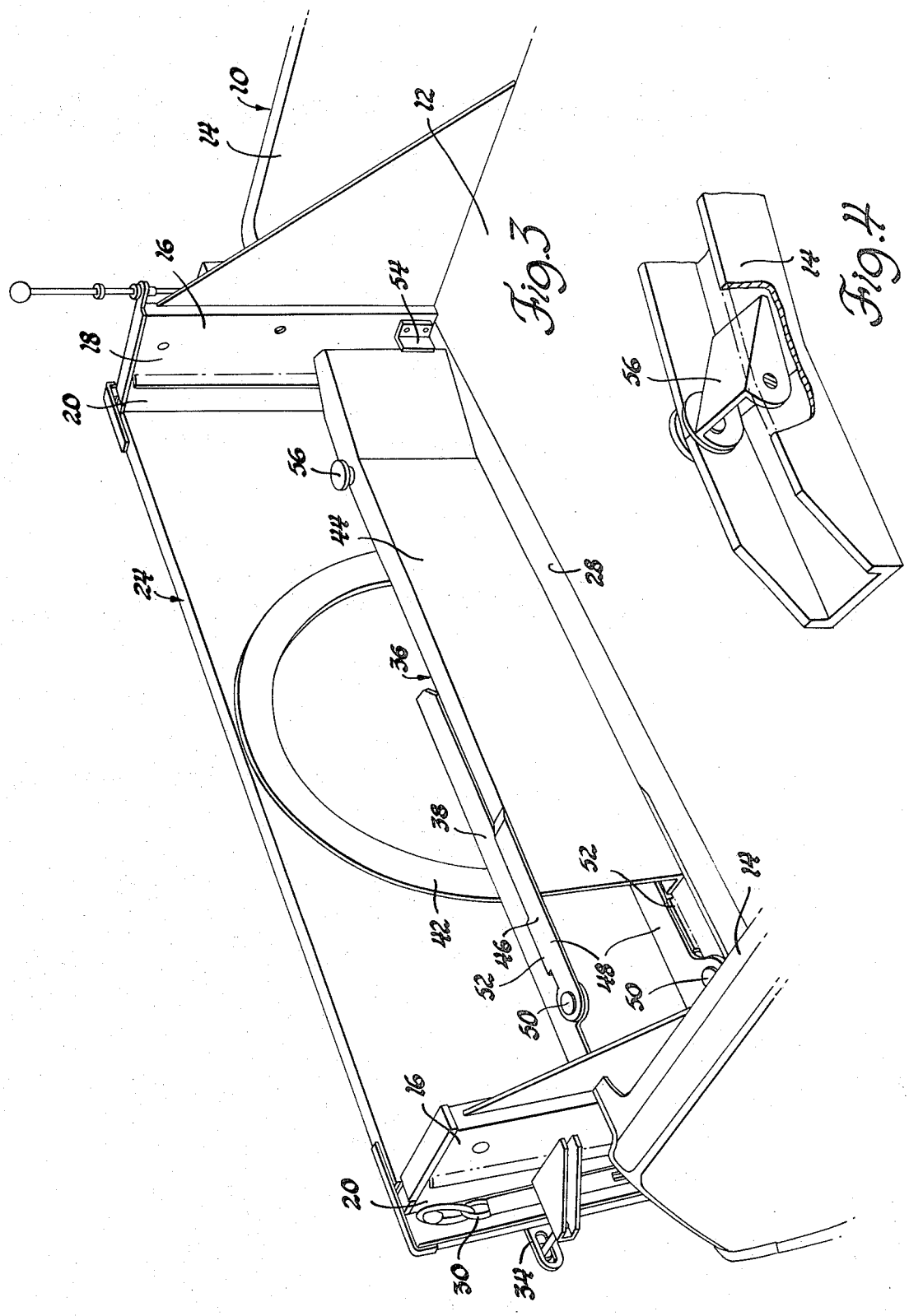

VEHICLE CARGO BED LOADER FOR ELONGATED ARTICLES

BACKGROUND OF THE INVENTION

This invention relates generally to a vehicle loader for loading and unloading elongated articles on an elevated cargo bed of the vehicle.

Certain vehicles, such as trucks, include elevated cargo beds accessible through gate openings selectively closed by movable gates. Usually this type of gate is pivotable about an axis located adjacent the lower edge of the gate opening for movement between a horizontal position where the gate is aligned with the plane of the cargo bed to allow access to the cargo bed through the gate opening and a vertical position closing the gate opening. It is also known to provide the gate with a vertically movable support arrangement that translates the horizontal gate vertically between the elevated position aligned with the cargo bed and a lower position adjacent ground level. This vertical translation of the horizontal gate readily lends the gate for use in loading and unloading articles on the elevated cargo bed of the vehicle. U.S. Pat. to Brown No. 3,305,112 discloses a vehicle with a gate supported in the manner thus far described.

When this type of vertically movable gate is utilized to load and unload articles of elongated configurations on an elevated cargo bed of a vehicle, these operations may proceed somewhat less readily than for articles of other configurations. For instance, motorcycles do not have sizes or configurations which readily lend them to loading or unloading by use of a movable gate in the manner described.

SUMMARY OF THE INVENTION

One feature of this invention is that it provides a loader mounted on a vertically movable gate of a vehicle and including a plurality of elongated article receiving members connected to each other in an end-to-end relationship for movement between a folded storage position where the members extend transversely of an associated gate opening of the vehicle and an unfolded loading position where the members extend outwardly from the vehicle and facilitate loading and unloading of elongated articles on an elevated cargo bed of the vehicle. Another feature of the invention is that the article receiving members are pivotally connected to each other at their adjacent ends and the loader is mounted on the gate by pivotally securing the article receiving member at one end of the loader to the gate for movement about an axis normal to the plane of the gate such that the loader is readily movable between the folded storage position and the unfolded loading position. Another feature of the invention is that the article receiving members have channel-shaped cross sections that open upwardly when the loader is in loading position with the gate in horizontal position and each pivotal connection between the adjacent ends of the article receiving members is normal to the side walls of these members. Another feature of the invention is that the article receiving member at the free end of the loader includes a stop member movable between a position closing the channel-shaped cross section of this member and a position opening the same so as to facilitate loading and unloading of a motorcycle on the cargo bed by way of the loader. Another feature of the invention is that the article receiving member at the free end of the loader is engaged by a portion of the vehicle as the gate is pivoted to a position closing the gate opening with the loader in its folded storage position to thus maintain the loader in the storage position during operation of the vehicle. Another feature of the invention is that the pivotal axis between the gate and the loader is located at a central portion of the gate adjacent the axis about which the gate pivots such that the loader is stored adjacent the plane of the cargo bed with the gate in closed position. Another feature of the invention is that the pivotal connections between adjacent ends of the article receiving members is by way of flanged bifurcated ends of one of these members and the flanges thereof locate the article receiving members relative to each other while in the unfolded loading position.

BRIEF DESCRIPTION OF THE DRAWINGS

The above specified features and other features of this invention are readily apparent from the following description of the preferred embodiment and the drawings in which:

FIG. 1 is a partially broken away perspective view of a vehicle with an elevated cargo bed whose gate is positioned in an elevated horizontal position supporting a loader, according to this invention, shown in an unfolded loading position;

FIG. 2 is a view generally similar to FIG. 1 but with the gate shown in a lower horizontal position where it positions the loader adjacent ground level;

FIG. 3 is a perspective view of the gate and loader showing the loader in a folded storage position extending transversely of the gate opening which has been closed by pivoting the gate upwardly from its FIG. 1 position to a vertical position; and FIG. 4 is a perspective view of the free end of the loader and shows a stop member that is movable between positions opening and closing the channel-shaped cross section of this portion of the loader to facilitate use of the loader in loading and unloading of a motorcycle on the elevated cargo bed of the vehicle.

DESCRIPTION OF THE PREFERRED EMBODIMENT

FIG. 1 of the drawings shows a pick-up type truck vehicle 10 having an elevated cargo bed 12 bounded on opposite lateral sides of the vehicle by vertical side panels 14. A pair of upstanding vehicle mounted support members 16 are located adjacent the rear ends of the side panels 14 and cooperate with the cargo bed to define a rear gate opening indicated generally by 18. A pair of movable support members 20 are respectively associated with support members 16 and, as can be seen by additionally referring to FIG. 2, links 22 connect the movable support members to the fixed support members for four-bar linkage movement between the elevated and lower portions respectively shown by FIGS. 1 and 2. The lower ends of the movable support members 20 pivotally support a generally rectangular gate 24 by way of a pintle rod 26 extending transversely of the vehicle. The pivotal gate movement is between the horizontal position shown in FIG. 1 and the vertical position shown in FIG. 3 where the gate closes the gate opening 18. An auxiliary cargo bed portion 28 is also supported by the lower ends of movable support members 20 and provides a filler between the gate 24 and the rear end of cargo bed 12 when the movable support members 20 are in their elevated positions adjacent the fixed support members 16, as in FIGS. 1 and 3.

A pair of chains 30 extend between the upper ends of movable support members 20 and the gate 24 to limit downward gate movement and to position the gate in its horizontal position shown by FIGS. 1 and 2. As seen in FIG. 2, a pair of retractable cables 32 are attached to the upper ends of movable support members 20 and are retracted and extended by suitable vehicle mounted retractors that are not shown in order to raise and lower the gate arrangement between the elevated position of FIG. 1 and the lower position of FIG. 2. A pair of bracket and pin arrangements 34 are adaptable to maintain the gate 24 in the vertical position of FIG. 3 where it closes the gate opening 18.

The gate 28 supports a loader 36, according to this invention, which is adaptable to be utilized with the gate for loading and unloading elongated articles on the cargo bed 12. The loader includes a first channel-shaped article receiving member 38 with one end pivoted to gate 24 about an axis A by way of a headed pin 40. This axis of pivotal movement is normal to the plane of gate 24 and is located adjacent to the axis of pivotal gate movement about rod 26 for reasons that will become apparent. An arcuate slide portion 42 on gate 24 is concentric with pin 40 and slidably engages the lower side of member 38 during its pivotal movement about axis A. The loader 36 also includes a second channel-shaped article receiving member 44 having a bifurcated end 46 whose legs 48 are pivoted to the free end of member 38 by pins 50. Member 44 is thus supported on member 38 for pivotal movement about an axis B between an unfolded loading position where these members are maintained in an aligned relationship extending outwardly from the vehicle, FIGS. 1 and 2, and a folded storage position where they extend alongside each other, FIG. 3. A pair of positioning flanges 52 on the bifurcated end of member 44 engages the upper ends of the side walls on member 38 when the loader is in loading position so as to limit the downward pivoting movement of member 44 and maintain this member in alignment with member 38.

The loader 36 is normally stored during vehicle operation in the folded storage position of FIG. 3. In this storage position, member 44 is pivoted about axis B to the position in which member 44 extends alongside member 38 with the free end of member 44 extending past the end of member 38 which is pivoted to gate 24. The free end of member 44 is automatically engaged by a vehicle body mounted flange 54 as the gate 24 is moved to its FIG. 3 position with the loader in its folded storage position. This engagement maintains the loader in storage position during vehicle operation. Also, since the location of axis A is adjacent to the pivotal axis of gate movement about rod 26, the lower side of the stored loader is supported by the auxiliary cargo bed portion 28 to further position the stored loader during vehicle operation.

Downward pivoting gate movement about rod 26 from the vertical position of FIG. 3 to the horizontal position of FIG. 1 allows the folded loader to be pivoted about axis A from the storage position extending transversely of the vehicle to a position where the folded members 38 and 44 extend longitudinally of the vehicle. The member 44 is then pivoted upwardly about axis B and subsequently downwardly until it is aligned with member 38 in the unfolded loading position shown by FIG. 1. Downward movement of the gate 24 from the elevated position of FIG. 1 to the lower position of FIG. 2 positions the loader 36 adjacent ground level where it readily receives elongated articles to be loaded on cargo bed 12. For instance, motorcycles or elongated steel rods may then be readily positioned on the loader and readied for loading. A stop 56 shown in FIG. 4 is pivotally movable between positions opening and closing the free end of channel member 44 such that a motorcycle can be easily rolled onto the loader but will not roll off of it. Subsequent upward movement of the gate 24 to the elevated position of FIG. 1 moves an article on loader 36 to the same level as cargo bed 12. The article can then be moved forward from the loader onto the cargo bed without a great deal of effort. The loader 36 is then movable to its storage position in a manner generally the reverse of its unfolding movement so as to provide the loader with a compact configuration during operation of the vehicle with the article loaded on cargo bed 12.

The loaded article on cargo bed 12 is unloaded by an operation which is generally the reverse of the loading operation described above. Therefore, further description of the unloading operation will not be set forth in detail.

During the vertical movement of the unfolded loader between the elevated position of FIG. 1 and the lower position of FIG. 2, it is also possible to utilize a jack extending between ground and the free end of member 44 of the loader. The jack will thus provide an auxiliary support for the loader during its vertical movement.

The invention thus provides a loader for loading and unloading elongated articles on an elevated cargo bed of a vehicle.

What is claimed is:

1. In a vehicle having an elevated cargo bed accessible through a generally vertically extending gate opening of a generally rectangular configuration, the combination comprising, a generally rectangular gate for selectively closing the gate opening, vertically movable support means pivotally supporting the gate for movement between a generally vertical position and a generally horizontal position, the support means being movable between an elevated position where the vertical gate closes the gate opening and where the horizontal gate is generally aligned with the elevated cargo bed to allow access thereto through the gate opening and a lower position where the horizontal gate is located adjacent to ground level, a loader including a plurality of elongated article receiving members serially connected for movement between a folded storage position and an unfolded loading position, and means mounting the loader on the gate for positioning the folded loader in an orientation extending transversely of the gate opening and for positioning the unfolded loader in an orientation extending outwardly from the gate in its horizontal position, the support means being movable between the elevated and lower positions with the loader in its unfolded loading position so as to facilitate loading and unloading of elongated articles on the elevated cargo bed.

2. In a vehicle having an elevated cargo bed accessible through a generally vertically extending gate opening of a generally rectangular configuration, the combination comprising, a generally rectangular gate for selectively closing the gate opening, vertically movable support means pivotally supporting the gate for movement between a generally vertical position and generally horizontal position, the support means being movable between an elevated position where the vertical gate closes the gate opening and where the horizontal gate is generally aligned with the elevated cargo bed to allow access thereto through the gate opening and a lower position where the horizontal gate is located adjacent to ground level, a loader including a plurality of elongated article receiving members pivotally connected in an end-to-end relationship for movement between a folded storage position and an unfolded loading position, and means pivotally mounting the terminal member at one end of the loader on the gate for movement about an axis located generally normal to the plane of the gate such that the folded loader is movable to an orientation extending transversely of the gate opening and the unfolded loader is movable to an orientation extending outwardly from the gate in its horizontal position, the support means being movable between the elevated and lower positions with the loader in its unfolded loading position so as to facilitate loading and unloading of elongated articles on the cargo bed.

3. The combination of claim 2 wherein the article receiving members have channel-shaped cross sections that open upwardly when the loader is in loading position with the gate in horizontal position, and wherein each pivotal connection between adjacent ends of the members extends normal to the side walls of the members.

4. The combination of claim 2 wherein the terminal article receiving member at the free end of the loader includes a stop member movable between a position closing the channel-shaped cross section of this member and a position opening the same so as to facilitate loading and unloading of a motorcycle on the cargo bed.

5. The combination of claim 2 wherein the terminal article receiving member at the free end of the loader is engaged by a portion of the vehicle as the gate is pivoted upwardly to close the gate opening with the loader in its folded storage position to thus maintain the loader in this storage position during operation of the vehicle with the gate closed.

6. In a vehicle having an elevated cargo bed accessible through a generally vertically extending gate opening of a generally rectangular configuration, the combination comprising, a generally rectangular gate for selectively closing the gate opening, vertically movable support means pivotally supporting the gate for movement between a generally vertical position and a generally horizontal position, the support means being movable between an elevated position where the vertical gate closes the gate opening and where the horizontal gate is generally aligned with the elevated cargo bed to allow access thereto through the gate opening and a lower position where the horizontal gate is located adjacent to ground level, a loader including a pair of elongated article receiving members having channel-shaped cross sections, these members being pivoted to each other end-to-end about an axis normal to the side walls of the members for movement between a folded storage position and an unfolded loading position, and means pivoting one of the article receiving members to the gate on the side thereof that faces upwardly while the gate is horizontal and with this axis of pivoting normal to the plane of the gate such that the folded loader is movable to an orientation extending transversely of the gate opening and the unfolded loader is movable to an orientation extending outwardly from the gate in its horizontal position, the support means being movable between the elevated and lower positions with the loader in loading position so as to facilitate loading and unloading of elongated articles on the cargo bed.

7. The combination of claim 6 wherein the pivotal axis between the loader and the gate is located at a central portion of the gate adjacent the axis about which the gate pivots such that the loader is stored adjacent the plane of the cargo bed with the gate in closed position.

8. The combination of claim 7 wherein the vehicle includes a body mounted member for engaging the free end of the other article receiving member so as to maintain the stored loader in position during operation of the vehicle.

9. The combination of claim 6 wherein one of the channel-shaped article receiving members includes flange portions for engaging the other article receiving member to maintain these members in the loading position in alignment with each other.

10. The combination of claim 6 wherein one of the channel-shaped article receiving members includes a flanged bifurcated end at which the members are pivoted to each other and whose flanges engage the other article receiving member to locate these members in alignment with each other in the loading position.

* * * * *